(12) United States Patent
Sakurai

(10) Patent No.: US 9,306,699 B2
(45) Date of Patent: Apr. 5, 2016

(54) WAVELENGTH-SELECTIVE SWITCH ARRAY

(71) Applicant: Santec Corporation, Aichi (JP)

(72) Inventor: Yasuki Sakurai, Aichi (JP)

(73) Assignee: Santec Corporation, Aichi (JP)

( * ) Notice: Subject to any disclaimer, the term of this patent is extended or adjusted under 35 U.S.C. 154(b) by 200 days.

(21) Appl. No.: 14/144,952

(22) Filed: Dec. 31, 2013

(65) Prior Publication Data

US 2015/0188656 A1 Jul. 2, 2015

(51) Int. Cl.
*H04J 14/02* (2006.01)
*G02B 6/293* (2006.01)
*G02B 6/35* (2006.01)
*H04Q 11/00* (2006.01)

(52) U.S. Cl.
CPC ........... *H04J 14/0212* (2013.01); *G02B 6/2938* (2013.01); *G02B 6/356* (2013.01); *H04Q 11/0005* (2013.01); *H04Q 11/0066* (2013.01); *H04Q 2011/0058* (2013.01)

(58) Field of Classification Search
CPC .................................................. H04J 14/0212
See application file for complete search history.

(56) References Cited

U.S. PATENT DOCUMENTS

| 6,415,069 | B1 * | 7/2002 | Chao | G02B 6/3578 |
| | | | | 359/813 |
| 6,658,175 | B2 | 12/2003 | Zami et al. | |
| 6,678,473 | B1 | 1/2004 | Morthier | |
| 7,397,980 | B2 | 7/2008 | Frisken | |
| 7,787,720 | B2 | 8/2010 | Frisken et al. | |
| 8,437,634 | B2 | 5/2013 | Sakurai | |
| 8,526,814 | B2 * | 9/2013 | Uehara | H04Q 11/0005 |
| | | | | 398/50 |
| 2008/0131119 | A1 * | 6/2008 | Okada | G02B 6/3512 |
| | | | | 398/45 |
| 2012/0237218 | A1 * | 9/2012 | Yang | G02B 6/356 |
| | | | | 398/48 |
| 2013/0128215 | A1 | 5/2013 | Sakurai | |
| 2013/0209031 | A1 * | 8/2013 | McLaughlin | G02B 6/3518 |
| | | | | 385/17 |

OTHER PUBLICATIONS

Roorda, Peter. "Critical Issues for the Flexible Spectrum Network." JDSU: Apr. 1-4, 2012. <http://www.jdsu.com/ProductLiterature/flexible-spectrum-network-wp-oc-ae.pdf>.

* cited by examiner

*Primary Examiner* — Nathan Curs
(74) *Attorney, Agent, or Firm* — Osha Liang LLP

(57) ABSTRACT

An input section for a wavelength-selective switch array includes a plurality of optical ports. The plurality of optical ports includes a first sub-plurality of optical ports having a plurality of first port optical axes, a second sub-plurality of optical ports having a plurality of second port optical axes, and a plurality of optical power elements. Each one of the plurality of optical power elements is disposed at an end of a respective one of each of the plurality of optical ports. The plurality of optical power elements further includes a first sub-plurality of optical power elements including a plurality of first optical power element optical axes displaced relative to the plurality of first port optical axes and a second sub-plurality of optical power elements including a plurality of second optical power element optical axes displaced relative to the plurality of second port optical axes.

21 Claims, 5 Drawing Sheets

WAVELENGTH-SELECTIVE SWITCH ARRAY

BACKGROUND

The invention relates generally to a wavelength selective switch (WSS) array for use in optical communication networks. Optical networks are employed in order to support present day demand for high-speed, high-capacity advanced telecommunications and data networks. These networks commonly use a technique known as optical wavelength division multiplexing (WDM) to exploit as much of the optical spectrum as possible. Optical WDM is analogous to radio WDM in that data is modulated onto several different carrier waves of different wavelengths, with carriers at different wavelengths referred to as channels. In optical WDM, a light wave is used rather than a radio wave with the different wavelength channels corresponding to different frequencies (wavelengths) of light. Optical communications are commonly employed in and around a wavelength of 1-2 microns.

In many optical networks, optical nodes are employed that correspond to branch points of the optical network. Often, it is desirable for the nodes to employ Reconfigurable Optical Add Drop Multiplexer (ROADM) devices that have a reconfigurable add-drop functionality. Generally speaking, ROADM functionality allows for the removal or addition of one or more wavelength channels at the node.

In order to realize a ROADM system, a WSS may be employed for the routing of any arbitrary wavelength channel. In a WSS, a light beam deflection device such as a spatial light modulator may be used to select a wavelength for deflection to a desired output port, e.g., deflection of a wavelength channel to a drop port will result in that channel being dropped from the WDM signal. Furthermore, WSS's that employ MEMS (Micro-Electro-Mechanical System) or LCOS (Liquid Crystal on Silicon) based spatial light modulators are also currently in use.

Conventionally, ROADM nodes employ the Broadcast and Select (BS) scheme that requires a WSS and an optical splitter. However, future devices may employ route and select (RS) schemes that employ multiple WSS devices without the use of the optical splitter.

SUMMARY

In general, in one aspect, one or more embodiments of the invention are directed to an input section for a wavelength selective switch (WSS) array. The input section includes a plurality of optical ports. The plurality of optical ports includes a first sub-plurality of optical ports having a plurality of first port optical axes, a second sub-plurality of optical ports having a plurality of second port optical axes, and a plurality of optical power elements. Each one of the plurality of optical power elements is disposed at an end of a respective one of each of the plurality of optical ports. The plurality of optical power elements further includes a first sub-plurality of optical power elements including a plurality of first optical power element optical axes displaced relative to the plurality of first port optical axes and a second sub-plurality of optical power elements including a plurality of second optical power element optical axes displaced relative to the plurality of second port optical axes.

In general, in one aspect, one or more embodiments of the invention are directed to a WSS array for switching a first optical wavelength division multiplexed (WDM) signal and a second WDM signal. The WSS array includes an input section, a beam deflection element, an optical system interposed between the input section and a beam deflection element configured to deflect one or more wavelength channels of the first and second WDM signals. The input section further includes a plurality of optical ports and a plurality of optical power elements. The plurality of optical ports further includes a first input port configured to input the first WDM signal, wherein the first input port includes a first input port optical axis, and a second input port configured to input the second WDM signal, wherein the second input port includes a second input port optical axis. Each one of the plurality of optical power elements is disposed at an end of a respective one of each of the plurality of optical ports. The plurality of optical power elements further includes a first optical power element including a first optical power element optical axis displaced a first displacement relative to the plurality of first port optical axis and a second optical power element including a second optical power element optical axis displaced a second displacement relative to the second port optical axis. The first displacement results in a first displacement angle of the first WDM signal after exiting the first input port and the second displacement results in a second displacement angle of the second WDM signal after exiting the second input port. The optical system that is interposed between the input section and the beam deflection element is configured to receive the first and second WDM signals output at the first and second angles, respectively, spectrally disperse the received first and second WDM signals into a first and a second set of wavelength channels, respectively, and project the first set of wavelength channels on a first portion of the beam deflection element and the second set of wavelength channels on a second portion of the beam deflection element.

In general, in one aspect, one or more embodiments of the invention are directed to a method for routing one or more wavelength channels of a plurality of WDM signals using a WSS array. The method includes receiving a first WDM signal from a first input port of a first WSS of the WSS array and receiving a second WDM signal from a second input port of a second WSS of the WSS array. The method further includes passing the first WDM signal through a first optical power element having an optical axis that is displaced from an optical axis of the first input port to direct the first WDM signal along a first angle, passing the second WDM signal through a second optical power element having an optical axis that is displaced from an optical axis of the second input port to direct the second WDM signal along a second angle. The method further includes passing the first and the second redirected WDM signals through a lens configured to convert the first and second angles to first and second displacements on a surface of a beam deflection element, wherein the beam deflection element is located at the focal plane of the lens, and passing the first and second redirected WDM signals through a dispersive element to angularly disperse at least a first and a second wavelength channel from the first and second redirected WDM signals, respectively. The method further includes focusing the first and the second wavelength channels onto a first and a second spatial portion, respectively, of the beam deflection element, deflecting along a third angle, by the beam deflection element, the at least one wavelength channel of the first WDM signal, and deflecting along a fourth angle, by the beam deflection element, the at least one wavelength channel of the second WDM signal. The method further includes passing the at least one deflected wavelength channel of the first and second WDM signals back through the dispersive element and the lens to convert the third and fourth angles to the first and second angles, respectively, and routing the at least one deflected wavelength channel of the first and second WDM signals respectively out of a first and a second output port of the first and second WSS, respectively.

Other aspects and advantages of one or more embodiments of the invention will be apparent from the following description and the appended claims.

BRIEF DESCRIPTION OF DRAWINGS

FIG. 2A shows a view along the y-axis and FIG. 2B shows a view along the z-axis.

DETAILED DESCRIPTION

Figure 1:
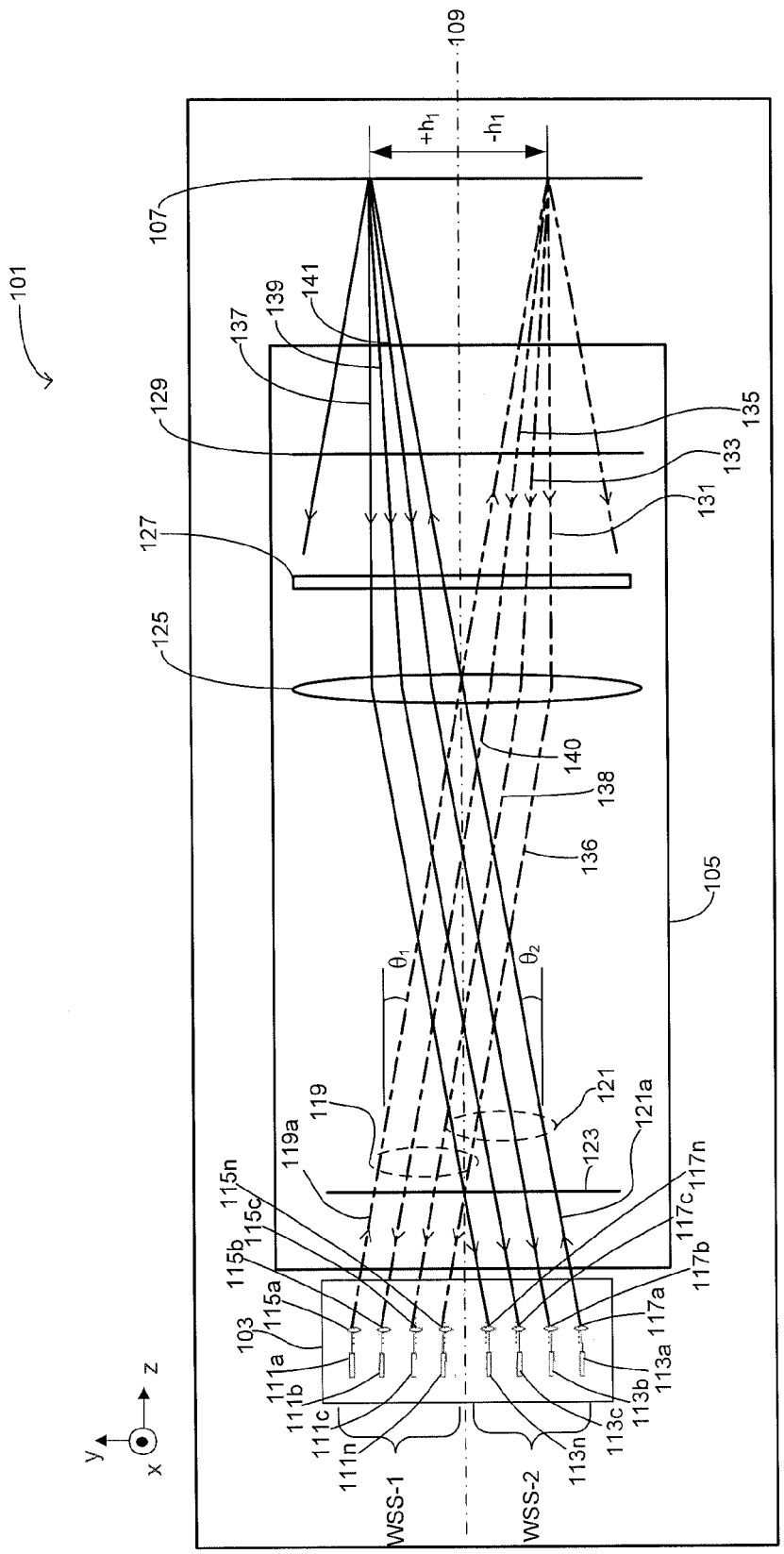
FIG. 1 shows a wavelength-selective switch array as viewed along the x-axis in accordance with one or more embodiments.

Specific embodiments of a wavelength-selective switch (WSS) array will now be described in detail with reference to the accompanying figures. Like elements in the various figures (also referred to as FIGS.) are denoted by like reference numerals for consistency.

In the following detailed description of embodiments, numerous specific details are set forth in order to provide a more thorough understanding of the WSS array. However, it will be apparent to one of ordinary skill in the art that these embodiments may be practiced without these specific details. In other instances, well-known features have not been described in detail to avoid unnecessarily complicating the description.

In general, one or more embodiments relate to a WSS array that employs at least two WSS's in a single package. The WSS array in accordance with one or more embodiments provides for independent operation of each WSS in the WSS array without the need for specialized optical components. Rather, many of the optical components may be shared between the individual WSS devices, and thus, cost and size may be reduced. Such a device is ideally suited for use in modern communication networks, e.g., as a reconfigurable optical add/drop multiplexer (ROADM). Furthermore, one or more coupled two-WSS arrays may be ideally suited as components in a branching node that employs route and select (RS) architecture.

FIG. 1 shows a wavelength selective switch (WSS) array in accordance with one or more embodiments. The WSS array 101 includes two independent WSS devices, WSS-1 and WSS-2, each of which may operate as an independent WSS device. As used herein, the term "independent" refers to the capability of WSS-1 to independently process one or more WDM signals independently of WSS-2 and vice-versa. As used herein, the term "process" is used broadly and includes, e.g., modulating, attenuating, blocking, redirecting, and/or switching of individual wavelength channels that make up a respective WDM signal. The WSS array 101 further includes an input section 103, an optical system 105 configured to beam-shape the respective WDM signal beams and also configured to spectrally disperse (demultiplex) the respective WDM signals into their constituent wavelength channels (or groups of wavelength channels) and to spectrally combine (multiplex) the dispersed wavelength channels (or groups of wavelength channels) into one or more WDM signals. Furthermore, the WSS array 101 includes beam deflection element 107 configured to optically process the dispersed wavelength channels, e.g., to redirect individual wavelength channels along predetermined paths within the WSS array. In accordance with one or more embodiments, the beam deflection element 107 may be implemented as a pixilated liquid crystal spatial light modulator (referred to herein as a LC deflection element) or as any other suitable pixilated spatial light modulator, e.g., a MEMS based device employing micromirror pixels.

As described in more detail below, the WSS array 101 employs a symmetric architecture with reference to symmetry axis 109 thereby allowing a single optical system 105 and liquid crystal deflection element 107 to be shared among the several WSS's of the WSS array, e.g., WSS-1 and WSS-2 in this example. However, while WSS-1 and WSS-2 may share many of the same optics, the architecture according to one or more embodiments allows for the WSS devices of the WSS array to be independently controllable devices. Thus, the WSS array according to one or more embodiments provides for multi-WSS device having a reduced size and optical complexity yet still retaining the independent processing capability inherent to a larger, more costly device.

In one or more embodiments, the input section 103 may include several input and output ports for carrying one or more optical WDM signals, e.g., the device may include several optical fibers, planar waveguides, or the like, any of which may be assigned as input or output ports. In the embodiments of the invention described below, the input/output ports are implemented as optical fibers. However, any other type of port may be used without departing from the scope of the present invention.

In the illustrative embodiment shown in FIG. 1, the input section 103 includes an input section for WSS-1 that includes input fiber 111a and several output fibers 111b, 111c, ... 111n, where n is a non-zero integer. The input section 103 further includes an input section for WSS-2 that includes input fiber 113a and several output fibers 113b, 113c, ... 113n, where n is a non-zero integer. Thus, FIG. 1 shows, by way of example, an array of two 1×N WSS devices comprising WSS-1 and WSS-2. Stated differently, the input section 103 of WSS array 101 includes an array of optical fibers 111a, 111b, 111c, ... 111n and 113a, 113b, 113c, ... 113n that form a fiber stack along the y-axis of the device as shown in FIG. 1. In one or more embodiments, this stack lies in the y-z plane. Furthermore, in one or more embodiments, the symmetry line 109 also lies in the y-z plane and the input section 103 may be symmetric about symmetry line 109.

The input section 103 further includes a corresponding array of optical power elements, e.g., an array of collimation lenses in the form of an array of microlenses, or the like, that are each positioned in front of the output/inputs of the optical fibers. As used herein, the term "optical power element" includes any optical element that possesses the ability to guide/alter the direction of a light ray and/or focus a set of light rays, e.g., a refractive lens, a diffractive lens, a prism, a planar wave guiding device, or the like are all optical power elements within the scope of the present disclosure. Returning to FIG. 1, the first group of optical fibers 111a, 111b, 111c, ..., 111n in combination with a corresponding first group of collimation lenses 115a, 115b, 115c, ..., 115n form the input section of WSS-1, and a second group of optical fibers 113a, 113b, 113c, ..., 113n in combination with a corresponding second group of collimation lenses 117a, 117b, 117c, ..., 117n form the input section of WSS-2. While FIG. 1 shows the array of optical power elements implemented as an array of microlenses, other types of optical power elements may be used without departing from the scope of the present invention. For example, a planar light-wave circuit (PLC) type beam converter employing a tapered waveguide array, or the like, may be employed.

In one or more embodiments as described in further detail below in reference to FIG. 3, for example, the optical axes of the first group of fibers are displaced relative to the optical axes of the first group of collimation lenses. This relative displacement between the array of ports and the array of collimation lenses results in the first group of input and output beams 119 being launched into (or out of) the optical system 105 within the y-z plane and at an angle $\theta_1$ with respect to symmetry axis 109. For example, in the illustrative embodiment shown in FIG. 1, the optical axes of the first group of collimation lenses is displaced along the negative y-direction relative to the optical axes of the first group of fibers. This results in the group of input and output beams 119 from WSS-1 being launched along a direction $\theta_1$ that is generally downward (i.e., along a general direction having a y-component along the negative y-direction).

Likewise, the optical axes of the second group of fibers are displaced relative to the optical axes of the second group of collimation lenses, resulting in the second group of input and output beams 121 being launched into (or out of) the optical system 105 at an angle $\theta_2$ with respect to symmetry axis 109. For example, in the illustrative embodiment shown in FIG. 1, the optical axes of the second group of collimation lenses is displaced along the positive y-direction relative to the optical axes of the second group of fibers. This results in the group of input and output beams 121 from WSS-2 to be launched along a direction $\theta_2$ that is generally upward (i.e., along a general direction having a y-component along the positive y-direction).

As alluded to above, the illustrative example shown in FIG. 1 is a WSS array that employs two 1×N WSS devices: WSS-1 and WSS-2. Thus, in the example shown in FIG. 1 WSS-1 includes one input fiber 111a that launches a first WDM signal beam 119a into the device, and also includes one input fiber 113a that launches a second WDM signal 121a into the device. The input/output fiber configuration shown here is for the sake of illustration only and is not intended to limit the scope of the present invention. Rather, any useful input/output port combination is possible without departing from the scope of the present invention. For example, if the WSS array disclosed herein is to be used as one part of a ROADM branching node that employs route and select architecture, the ports of WSS-2 may be inverted to that shown, e.g., fiber 113a may be an output fiber and fibers 113b, 113c, . . . , 113n may be input fibers (for connection to another WSS array and for connection to the appropriate add/drop modules. In other words, the WSS-1 may serve as a demultiplexer and the WSS-2 may serve as a multiplexer and vice-versa.

Returning to the configuration shown in FIG. 1, the first WDM signal is launched into the device from input fiber 111a, and after passing through collimation lens 115a, forms WDM signal beam 119a travelling through optical system 105 in the y-z plane at an angle $\theta_1$. WDM signal beam 119a then encounters lens 123 for shaping the WDM signal beam 119a in the x-direction. In one example, lens 123 may be a cylindrical lens with its cylindrical axis along the y-direction and may work in combination with collimation lens 115a as a beam expanding telescope. Thus, lens 123 does not have an effect on the WDM signal beam as seen in the view shown in FIG. 1.

After passing though lens 123, the WDM signal beam 119a encounters lens 125. In the example shown in FIG. 1, lens 125 is a cylindrical lens with its cylindrical axis along the x-direction. The action of lens 125 relies on the LC deflection element 107 being positioned in the focal plane of lens 125. In addition, lens 125 is centered on the symmetry axis 109. Because the LC deflection element 107 is positioned at the focal plane of lens 125, any set of rays that originate from the same height on the LC deflection element 107 will emerge from lens 125 as a set of parallel rays. Conversely, any set of parallel rays entering lens 125 will be focused at the same height on LC deflection element 107.

For example, as shown in FIG. 1, any incoming beam travelling along the angle $\theta_1$ (e.g., WDM signal beam 119a) will be directed by lens 125 to a y-position of $-h_1$ on the LC deflection element 107. Conversely, the set of rays 131, 133, and 135 that originate from a position of $-h_1$ on LC deflection element 107 will exit lens 125 as parallel rays travelling at the same angle $\theta_1$ as shown in FIG. 1. Likewise, any incoming beam travelling along the angle $\theta_2$ (e.g., WDM signal beam 121a) will be directed by lens 125 to a y-position of $+h_1$ on the LC deflection element 107. Conversely, the set of rays 137, 139, and 141 that originate from a position of $+h_1$ on LC deflection element 107 will exit lens 125 as parallel rays travelling at the same angle $\theta_2$ as shown in FIG. 1.

Figure 2B:
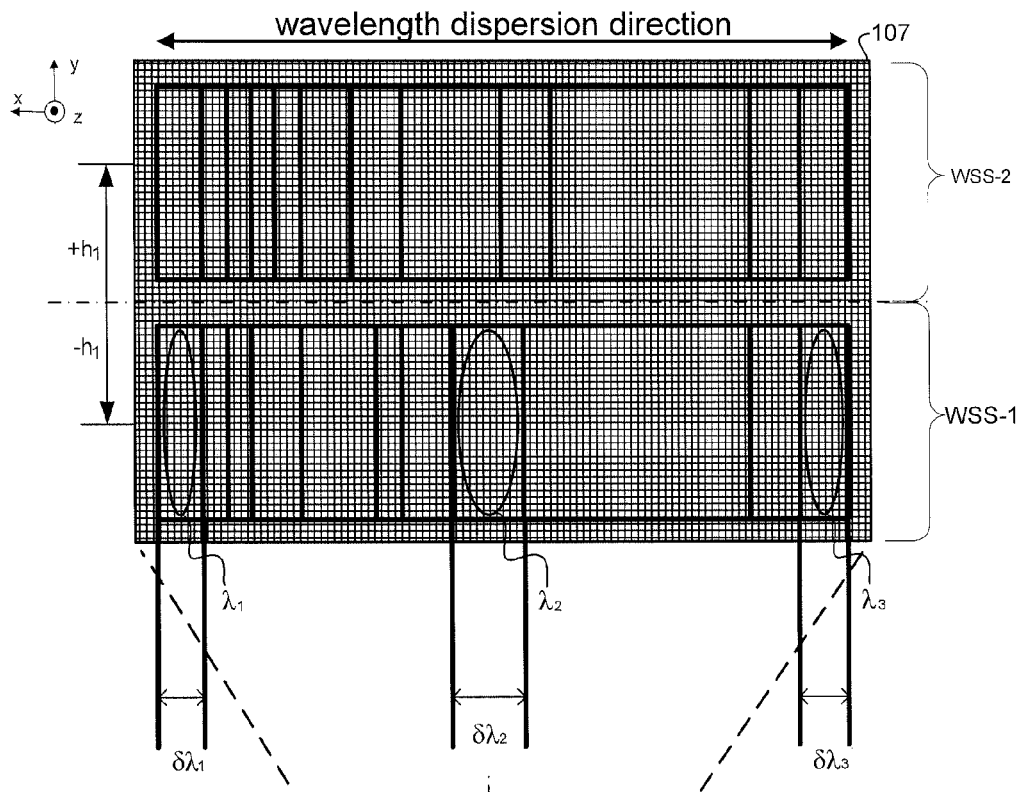
FIGS. 2A and 2B show a wavelength-selective switch array in accordance with one or more embodiments.
Figure 2A:
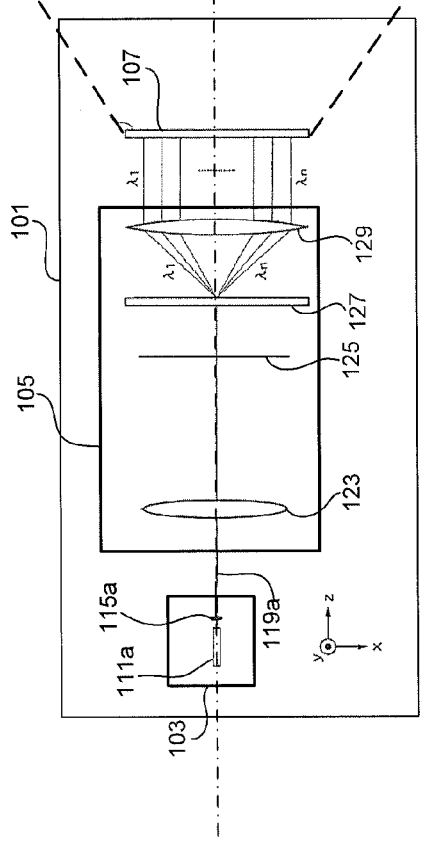

Returning to the progression of WDM signal beam 119a through the optical system 105, after passing through lens 125, the WDM signal beam 119a passes through dispersive element 127 that angularly disperses the wavelength channels of the WDM signal beam 119a in the x-z plane as shown in the view of the device shown in FIGS. 2A-2B. In one or more embodiments, the dispersive element 127 may be a diffraction grating, a prism, or a grism (diffraction grating prism combination), or any other suitably dispersive optic. While the dispersive element 127 is shown here as a transmissive optic, a reflective optic, e.g., a blazed grating, or the like, may be used without departing from the scope of the present invention.

After passing through the dispersive element 127, the dispersed wavelength channels pass through lens 129 that focuses the dispersed wavelength channels onto the LC deflection element 107 as shown in further detail in FIGS. 2A-2B. In one or more embodiments, the lens 129 may be a cylindrical lens with its cylindrical axis along the y-direction.

The LC deflection element 107 is a 2-dimensional pixelated optical element, e.g., a pixellated spatial light modulator, that may reflect or redirect one or more of the dispersed wavelength channels so that one or more of the wavelength channels may be routed to any one of the output fibers as described in more detail below.

With respect to WSS-1, according to one or more embodiments, because of lens 125, all of the rays that originate from a y-position $-h_1$ on the LC deflection element will be output from lens 125 along the angle $\theta_1$ as shown in FIG. 1 but will be displaced relative to each other by an amount that depends on the deflection angle from the LC deflection element 107. Accordingly, with the LC deflection angle set appropriately, the reflected output rays (e.g., those that correspond to the set of rays 131, 133, 135, each of which may include one or more of the wavelength channels of the WDM signal beam 119a) may be routed to any one of output fibers 111b, 111c, . . . , 111n. Furthermore, in one or more embodiments, because each of the collimation lenses is displaced relative to its corresponding output fiber by the same amount, the individual output beams can be recoupled into their respective output fibers with improved efficiency.

Likewise, regarding WSS-2, according to one or more embodiments, because of lens 125, all of the rays that originate from a y-position $+h_1$ on the LC deflection element 107 will be output from lens 125 along the angle $\theta_2$ as shown in FIG. 1 but will be displaced relative to each other by an amount that depends on the deflection angle from the LC deflection element. Accordingly, with the LC deflection angle set appropriately, the reflected output beams (e.g., those that correspond to the set of rays 137, 139, and 141, each of which may include one or more of the wavelength channels of the WDM signal beam 121*a*) may be routed to any one of output fibers 113*b*, 113*c*, . . . , 113*n*. Furthermore, in one or more embodiments, because each of the collimations lenses is displaced relative to its corresponding output fiber by the same amount, the individual output beams can be recoupled into their respective output fibers with improved efficiency.

Thus, the combination of input section 103 and lens 125 results in a WSS array device that launches a given set of beams along a given angle, e.g., $\theta_1$ for WSS-1 and $\theta_2$ for WSS-2 and then directs these beams to positions on the LC deflection element that depend only on the input angle ($-h_1$ for WSS-1 and $h_2$ for WSS-2). Thus, the WSS array according to one or more embodiments allows for the two sets of signals 119 and 121 to/from each WSS to share the same optical system 105 and LC deflection element 107, while simultaneously preserving the ability of the WSS array to separately process the individual wavelength channels as described in further detail below in reference to FIGS. 2A-2B.

FIG. 2A shows a WSS array device in accordance with one or more embodiments. More specifically, FIG. 2A shows an orthogonal view of the same device described above in reference to FIG. 1 (a view of the x-z-plane of the device). Accordingly, in this view, the stack of fibers and microlenses that form the input section 103 is viewed from the top of the fiber stack and thu, only input fiber 111*a* is seen with its corresponding microlens 115*a*. While the following description focuses on WSS-1, precisely the same description will apply for WSS-2 due to the symmetry of the system. As described above, for WSS-1, WDM signal beam 119*a* is launched into the system via input fiber 111*a*. In the view shown in FIG. 2A, the launch angle $\theta_1$ is into the page and thus, not visible. In one or more embodiments, WDM signal beam 119*a* includes a number of wavelength channels, with the channels having a wavelength range from a longest wavelength $\lambda_1$ to a shortest wavelength $\lambda_n$. In some examples, the number of wavelength channels may be large, e.g., 96 wavelength channels having a spacing of 50 or 100 GHz on a fixed grid. In other examples, the device may be employed in a flexible grid system that may employ frequency spacing of, e.g., 12.5 GHz and having more than 96 wavelength channels, e.g., 130 or more wavelength channels.

Returning to FIG. 2A, the WDM signal beam 119*a* first encounters lens 123 that serves to shape the WDM signal beam 119*a* in the x-direction, e.g., to expand the beam to a diameter in the x-direction that is suitable to achieve a desired beam size on the dispersive element 127. For example, the collimating lens 115*a* and lens 123 may serve as a beam expanding telescope. In one or more embodiments, the dispersive element 127 serves to angularly disperse the wavelength channels of the WDM signal beam as shown in FIG. 2A. After being angularly dispersed by dispersive element 127, the wavelength channels $\lambda_1$ to $\lambda_n$ are then focused onto the LC deflection element 107 by the lens 129 such that the wavelength channels are spatially dispersed in the x-direction according to wavelength on LC deflection element 107.

One example of a distribution of wavelength channels on the surface of the LC deflection element is shown more clearly in FIG. 2B, which shows the LC deflection element as viewed along the z-axis. More generally, the wavelength channels may be arranged on the two-dimensional surface of LC deflection element 107 (e.g., in the x-y pane) as elongated strips or elliptical spots. For simplicity, the wavelength channels are treated as discrete wavelength signals that may be operated on by the LC deflection element independently. However, in one or more embodiments, the LC deflection element need not be limited to operating on individual wavelength channels but may operate on groups of wavelength channels. Furthermore, as shown in FIG. 2B, the wavelength channels or groups of channels themselves need not have a fixed bandwidth because the LC deflection element may be implemented as a LCOS- or MEMS-based spatial light modulator that is fully reconfigurable on a dynamic basis. Accordingly, one or more embodiments of the present invention may be implemented in current fixed grid architectures and/or in current or later-developed flexible grid architectures.

Returning to FIG. 2A, the LC deflection element 107 may then selectively redirect one or more of the wavelength channels in a direction so as to eventually redirect the selected one or more wavelength channels $\lambda_1$ to $\lambda_n$, to one or more output ports (e.g., one or more of the other optical fibers that are hidden from view underneath fiber 111*a*, e.g., as shown in FIG. 1). In the case of the view shown in FIG. 2A, the redirection accomplished by the LC deflection element 107 is along an angle located in a plane that is perpendicular to the page (the beams are redirected along an angle in the y-z plane, e.g., as shown and described in further detail above in reference to FIG. 1). Once reflected from the LC deflection element 107, the redirected wavelength channels again encounter lens 129 and are further redirected to the dispersive element 127 where the redirected wavelength channels are recombined in the y-z plane. For example, those wavelength channels that are redirected along the same angle are recombined into a single beam that is then redirected along a direction that may allow for output of the processed signal at one of the output ports.

For example, consider a WDM signal beam 119*a* that includes three WDM channels having wavelengths $\lambda_1$, $\lambda_2$, and $\lambda_3$ and channel bandwidths $\delta\lambda_1$, $\delta\lambda_2$, and $\delta\lambda_3$, respectively. In the example shown in FIG. 1, the WDM signal beam 119*a* enters the system at a launch angle $\theta_1$ in the y-z plane. Furthermore, the ray representing the WDM signal beam 119*a* traveling at an angle $\theta_1$ in the y-z plane passes through the center of lens 125 and therefore is not deflected away from the angle $\theta_1$ in the y-z plane. Upon passing through the dispersive element 127, the three wavelength channels of WDM signal beam 119*a* are then angularly dispersed in a plane that is perpendicular to the y-z plane while all of the angularly dispersed channels still travel at an angle $\theta_1$ in the y-z plane. These three dispersed wavelength channels are then focused by lens 129 onto different x-positions on the LC deflection element 107 as shown in FIG. 2B.

With respect to the routing capability of the device, a number of different routing combinations are now possible. For example, consider that all three wavelength channels are desired to be routed to output port 111*n* shown in FIG. 1. Accordingly, the corresponding portions of the LC deflection element will deflect each of wavelength channels $\lambda_1$, $\lambda_2$, and $\lambda_3$ so that each of these wavelength channels returns along the ray 131 shown in FIG. 1. The action of the dispersive element 127 on the return path for these channels is to recombine (multiplex) each of the wavelength channels into the same beam now propagating in the y-z plane. This combined beam is then redirected by lens 125 to propagate along the output ray 136 having the launch angle $\theta_1$ in the y-z plane, but now displaced from input WDM signal beam 119*a* such that the action of collimating lens 115*n* is to couple the recombined and redirected WDM signal to the output fiber 111*n*. Thus, in this mode of operation, the action of WSS-1 is pass all three wavelength channels of WDM signal beam 119a from input fiber 115a to output fiber 111n.

In another example, perhaps it is desired to route several of the wavelength channels separately to different output fibers. For example, perhaps the LC deflection element 107 deflects the $\lambda_1$ channel along ray 133, deflects the $\lambda_2$ channel along ray 135, and directs the $\lambda_3$ channel along ray 131. Again, the action of the dispersive element is to redirect each of these beams into the y-z plane. However, in this case, the dispersive element will not recombine the beams into a single beam, but rather, will create a fan of three beams travelling in the y-z plane. Furthermore, because each of these beams originated from the same y-position on the LC deflection element 107, they will exit lens 125 as a set of parallel rays that propagate along the same launch angle $\theta_1$ as the original WDM signal beam 119a. However, because each beam entered lens 125 at a different height, the output beams will be displaced from one another such that, e.g., the $\lambda_1$ channel will propagate along ray 138, the $\lambda_2$ channel will propagate along ray 140, and the $\lambda_3$ channel will propagate along ray 136. Accordingly, in this configuration the action of WSS-1 is to route the $\lambda_1$ channel from input fiber 111a to output fiber 111c, to route the $\lambda_2$ channel from input fiber 111a to output fiber 111b, and to route the $\lambda_3$ channel from input fiber 111a to output fiber 111n.

In view of the above, it is clear that in one or more embodiments of the WSS array disclosed herein, the wavelength channels of any WDM signal may be arbitrarily routed to any of the output fibers. Furthermore, due to the symmetry of the system shown in FIG. 1, the above description also applies to routing WDM signals using WSS-2. This is because, as shown in FIG. 2B, the dispersed wavelength channels of WSS-1 and WSS-2 are eventually focused onto respectively different portions of the LC deflection element 107 (these portions are separated in the y-direction, as shown in FIG. 1 and FIG. 2B). Furthermore, while the example shown in FIGS. 1-3 employs one input port and n output ports, one may appreciate that the output ports may be reconfigured as input ports and vice-versa. Furthermore, without departing from the scope of the present invention, any number of input and output ports may be used. Likewise, while the example explicitly shown in FIGS. 1-3 is a WSS array that employs two WSS devices, any number of WSS devices may be employed without departing from the scope of the present invention. For example, if the input section is designed to employ four distinct launch angles, the array may accommodate four independent WSS devices.

Figure 3:
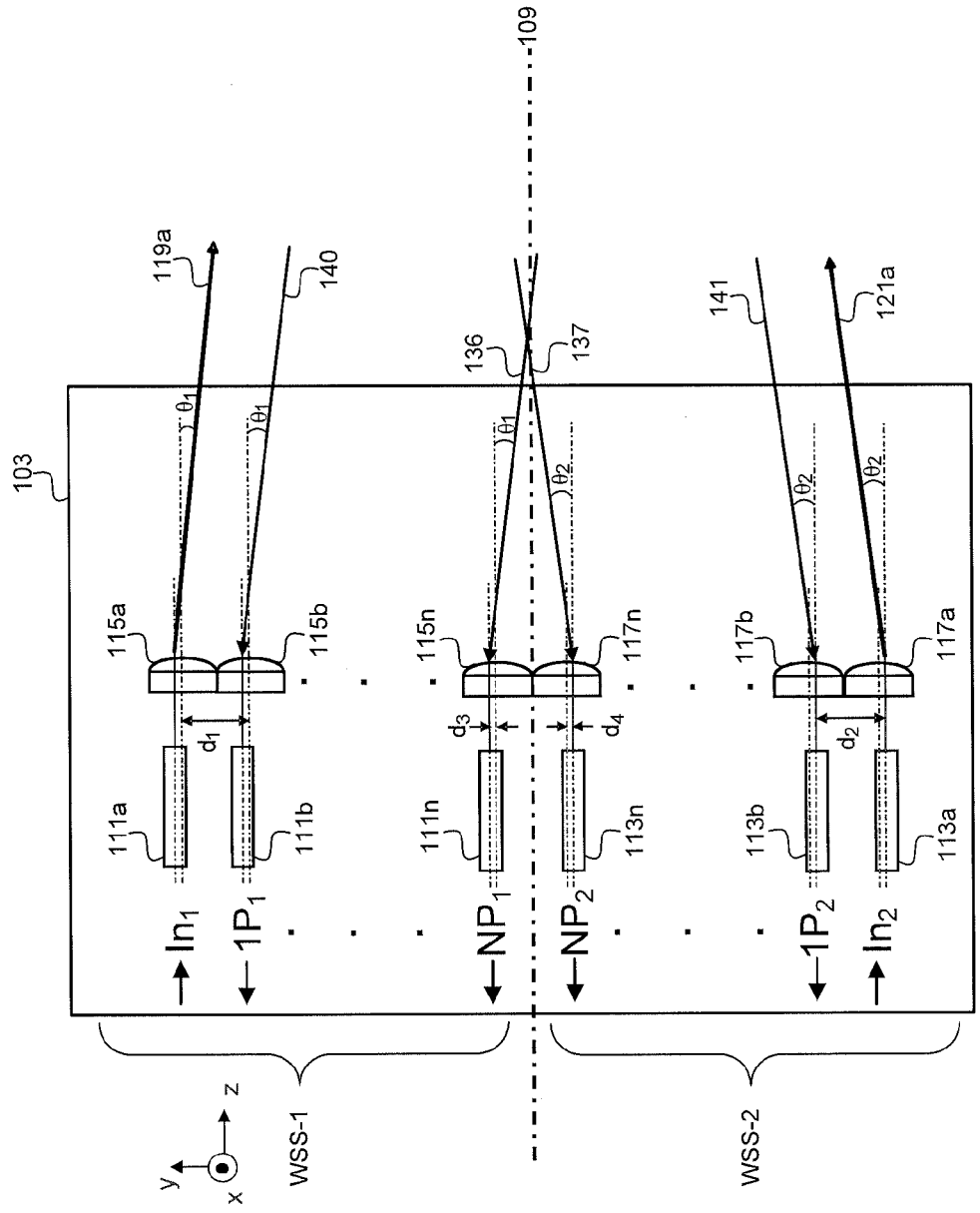
FIG. 3 shows an input section of a wavelength-selective switch array in accordance with one or more embodiments.

FIG. 3 shows an input section of a WSS array in accordance with one or more embodiments. More specifically, FIG. 3 shows a more detailed view of the input section 103 described in detail in reference to FIG. 1 above. As described previously, the input section 103 includes an input section for WSS-1 that includes input fiber 111a and several output fibers 111b, 111c, ... 111n, where n is a non-zero integer. The input section 103 further includes an input section for WSS-2 that includes input fiber 113a and several output fibers 113b, 113c, ... 113n, where n is a non-zero integer. The input section 103 further includes a corresponding array of collimation lenses, e.g., an array of microlenses, or the like that are each positioned in front of the output/inputs of the optical fibers. Accordingly, the first group of optical fibers 111a, 111b, 111c, ..., 111n in combination with a corresponding first group of collimation lenses 115a, 115b, 115c, ..., 115n form the input section of WSS-1, and a second group of optical fibers 113a, 113b, 113c, ..., 113n in combination with a corresponding second group of collimation lenses 117a, 117b, 117c, ..., 117n form the input section of WSS-2.

With respect to the array of microlenses, as shown in FIG. 3, this may be an array of contiguous, uniformly spaced micro-optics that is manufactured as an integrated unit. Accordingly, the microlenses may be formed on the surface of a bulk material, e.g., fused silica, silicon, or any other suitable material. In one or more embodiments, the distance between each lens in the array, shown as $d_1$ in FIG. 3 and commonly referred to as the "lens pitch" may be 250 microns. However, any other lens pitch is also possible depending on the particular design. Examples of some commercially available lens pitches include 125 microns and 500 microns.

With respect to the array of fibers, each fiber is positioned to correspond approximately with its respective microlens. Thus, in one or more embodiments, the fiber pitch $d_2$ is approximately equal to the microlens pitch. However, as described above in reference to FIG. 1, the first group of optical fibers that corresponds to WSS-1 may be displaced upward relative to the microlens array such that the optical axes of the group of fibers is displaced relative to the optical axes of the microlens array. The relative displacement between fiber axes and microlens array optical axes for the group of fibers and lenses associated with WSS-1 is shown as displacement $d_3$. In one or more embodiments, $d_3$ may be approximately 10 microns, i.e., the optical axes of the group of fibers 111a, 111b, ..., 111n are displaced approximately 10 microns upward relative to the optical axes of the microlenses. In one or more embodiments, this magnitude of displacement may yield a $\theta_1$ that is approximately a few degrees depending on the precise microlens array used. More generally, for any relative displacement $d_3$ between the lens and fiber optical axis, the resulting output angle is $$\theta = \tan^{-1} d_3 / f,$$

where f is the focal length of the microlens.

Similar to the first group of optical fibers corresponding to WSS-1, the second group of optical fibers corresponding to WSS-2 are also displaced relative to the microlens array such that the optical axes of the group of fibers is displaced relative to the optical axes of the microlens array. However, in the case of WSS-2, because an upward launch angle $\theta_2$ is desired, the fiber optical axes are displaced downward relative to the micro lens optical axes. This downward displacement is shown as $d_4$. While FIG. 3 shows a maximum symmetry arrangement where $d_3=-d_4$ and thus $\theta_1=-\theta_2$, other arrangements are possible without departing from the scope of the present invention. In one or more embodiments, the individual WSS input sections are designed to have different launch angles, but they need not necessarily be the negative of one another. Furthermore, while FIG. 3 shows a configuration showing only two WSS's, any number of WSS's having any number of launch angles may be employed without departing from the scope of the present invention.

Figure 4A:
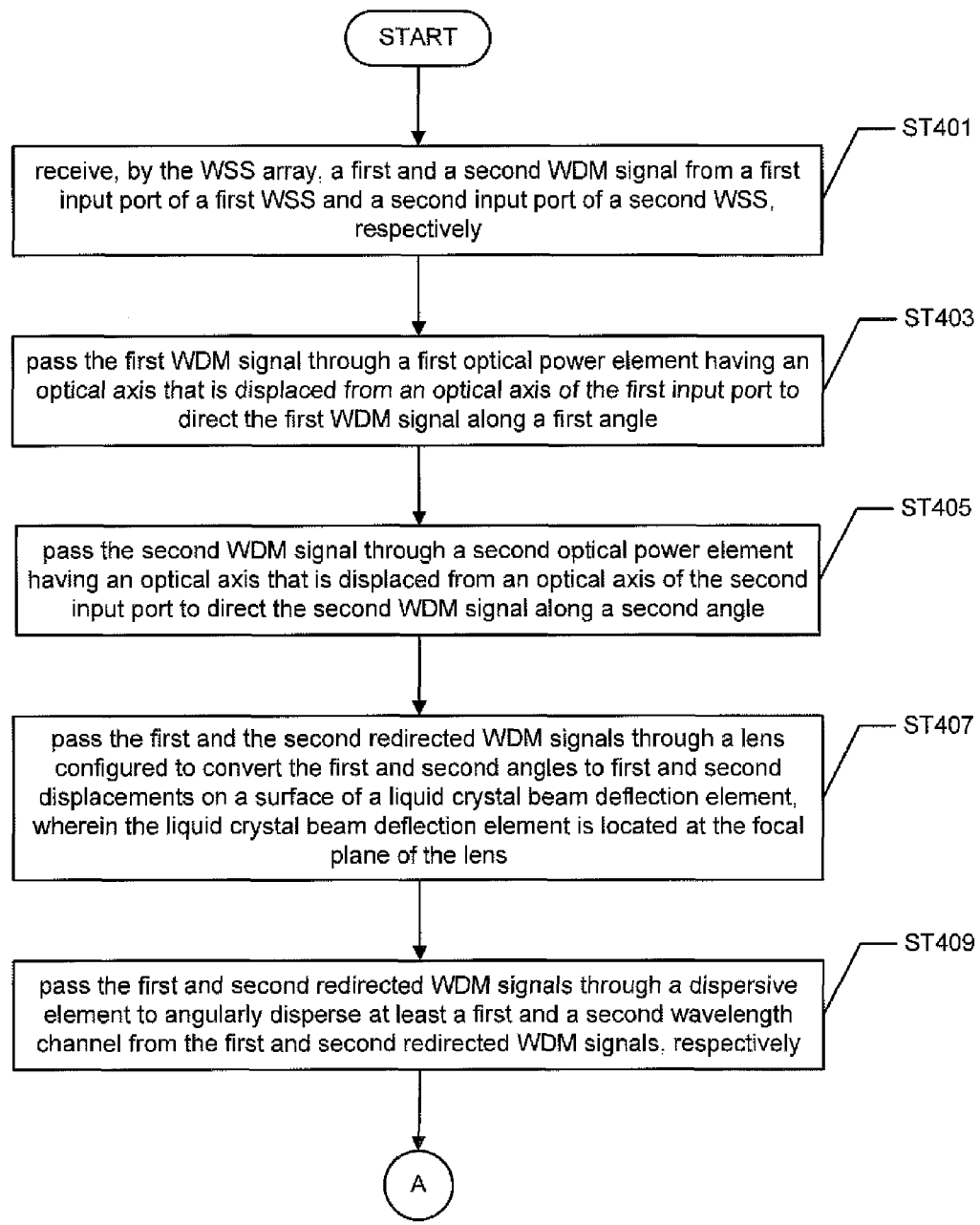
FIGS. 4A and 4B show a flow chart for a method in accordance with one or more embodiments.
Figure 4B:
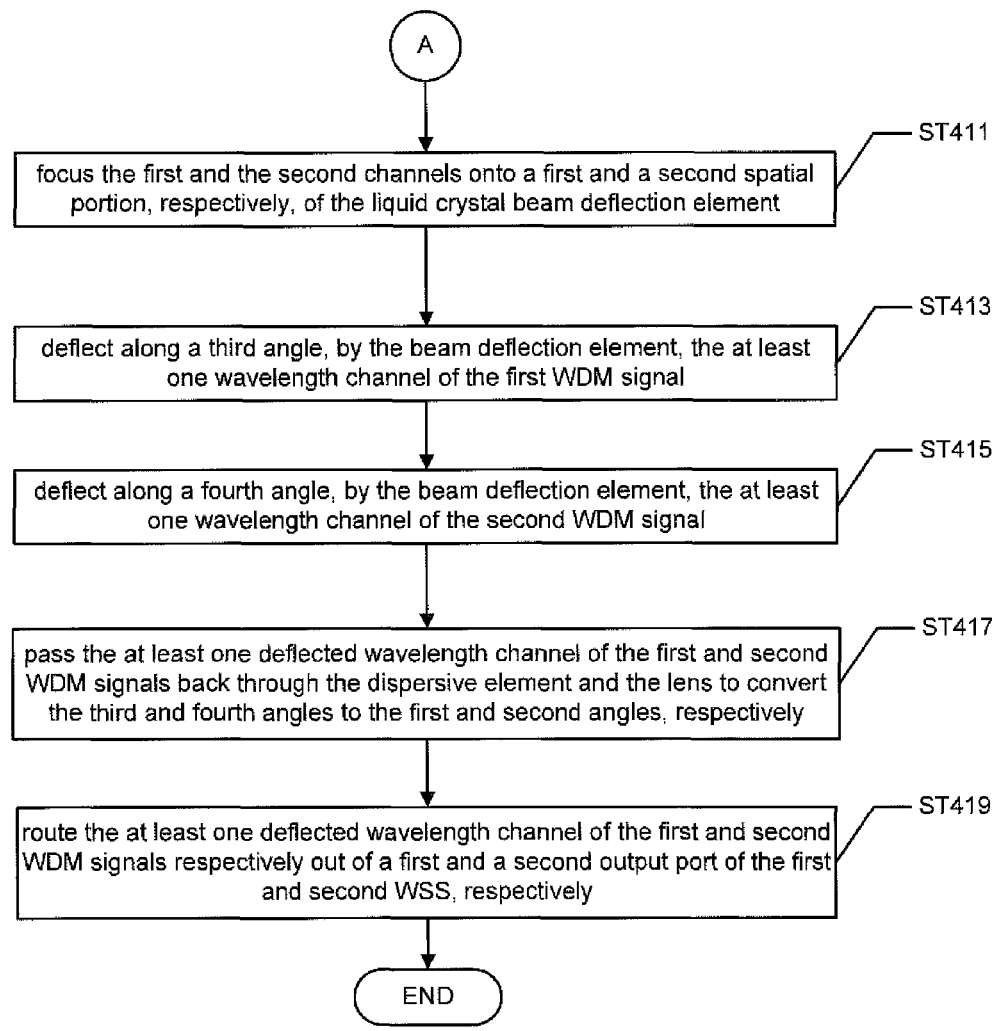

FIGS. 4A and 4B show a method for routing one or more wavelength channels of a plurality of WDM signals using a WSS array in accordance with one or more embodiments. While the various blocks in this flowchart are presented and described sequentially, one of ordinary skill will appreciate that, in accordance with one or more embodiments, at least a portion of the blocks may be executed in different orders, may be combined or omitted, and at least a portion of the blocks may be executed in parallel.

In step 401, the WSS array receives a first and a second WDM signal from a first input port of a first WSS and a second input port of a second WSS, respectively. For example, the first and second WSS may be similar to WSS-1 and WSS-2 shown and described above in reference to FIGS. 1-3. Likewise, the first and second input ports may be any of the ports shown above in FIGS. 1-3 and implemented as, e.g., optical fibers or any other suitable waveguide architecture employed for use in optical networking and/or telecommunications.

In step 403, the first WDM signal is passed through a first optical power element, e.g., a first microlens having an optical axis that is displaced from an optical axis of the first input port. Due to the displacement between the port optical axis and the microlens optical axis, the first WDM signal is directed along a first angle as it is outputted from the microlens. For example, as shown in FIGS. 1 and 3, the first WDM signal is launched into the WSS array along an angle $\theta_1$ (shown as downward in the FIGS.) because the port optical axis is displaced in a positive y-direction, relative to the optical axis of the microlens.

In step 405, the second WDM signal is passed through a second optical power element, e.g., a second microlens having an optical axis that is displaced from an optical axis of the second input port. Due to the displacement between the port optical axis and the microlens optical axis, the second WDM signal is directed along a second angle. For example, as shown in FIGS. 1 and 3, the second WDM signal is launched into the WSS array along an angle $\theta_2$ because the port optical axis is displaced in a negative y-direction, relative to the optical axis of the microlens.

In step 407, the first and the second redirected WDM signals are passed through a lens configured to convert the first and second angles to first and second displacements on a surface of a beam deflection element, wherein the beam deflection element is located at the focal plane of the lens. For example, the lens may be similar to lens 125 shown in FIG. 1. In other words, the lens 125 may be shared by all WSS devices of the WSS array.

In step 409, the first and second redirected WDM signals are passed through a dispersive element to angularly disperse at least a first and a second wavelength channel from the first and second redirected WDM signals, respectively. For example, the dispersive element may be a diffraction grating, a prism, or a combination grating and prism, known as a grism. FIG. 2A shows one example of a dispersive element 127 that may be used to angularly disperse one or more wavelength channels (e.g., $\lambda_1, \lambda_2, \ldots, \lambda_n$) of the WDM signals. While the dispersive element is shown as a transmissive optical element herein, a reflective dispersive element may be employed without departing from the scope of the present invention.

In step 411, the first and the second wavelength channels from the first and second WDM signals are focused onto a first and a second spatial portion, respectively, of the beam deflection element. For example, FIG. 2A shows that the focusing may be accomplished by lens 129 and FIG. 2B shows that the first wavelength channels from the first the first WMD signal may be focused at a position that is offset from the second wavelength channels by a distance 2h in the y-direction with the wavelength dispersion direction corresponding to the x-direction. Accordingly, the first and second wavelength channels may be processed independently by separate groups of pixels on the beam deflection element 107.

In step 413, the liquid crystal beam deflection element deflects at least one wavelength channel of the first WDM signal along a third angle. For example, if the liquid crystal beam deflection element is a liquid crystal on silicon spatial light modulator, the steering (deflection) of the wavelength channel may be accomplished by applying pixel voltages to a corresponding number of pixels impinged upon by the focused spot of the wavelength channel to impart a spatially varying phase onto the corresponding wavelength channel optical beam. Other known methods of beam steering may also be employed, e.g., a micromirror device (e.g., a MEMS chip, or the like) may be employed that steers a wavelength channel by tilting one or more micromirrors.

In step 415, the liquid crystal beam deflection element deflects at least one wavelength channel of the second WDM signal along a fourth angle in a manner that is identical to that described above in step 413. Graphical examples of the deflections described in steps 411 and 413 are shown and described above in reference to FIG. 1.

In step 417, the at least one deflected wavelength channel of the first and second WDM signals is passed back through the dispersive element and lens to convert the third and fourth angles to the first angle and second angles, respectively. As described above in reference to FIGS. 1 and 2A-2B, because the beam deflection element 107 is located in the focal plane of the lens 125, all rays that pass through lens 125 but originate from a common point on the surface of the beam deflection element (e.g., at a position +h or −h as shown in FIGS. 1 and 2B) are converted to a set of parallel rays (i.e., a set of rays that propagate at the same angle). This aspect of lens 125 is shown and described above in reference to FIGS. 1, 2A, and 2B.

In step 419, the deflected wavelength channels of the first and second WDM signals are respectively routed out of a first and a second output port of the first and second WSS, respectively.

The above example describes a WSS array each having at least one input port and one output port. Thus, the scope of the method disclosed herein includes WSS arrays that employ any possible combination of numbers of input and output ports. Accordingly, the method disclosed herein may be employed where two WSS arrays are coupled together to implement a branching network node that employs a route and select architecture and/or one or more WSS array as disclosed herein may be configured as a reconfigurable optical add drop multiplexer (ROADM).

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. An input section for a wavelength selective switch array comprising:
    a plurality of optical ports comprising:
        a first sub-plurality of optical ports having a plurality of first port optical axes; and
        a second sub-plurality of optical ports having a plurality of second port optical axes; and
    a plurality of optical power elements, wherein each one of the plurality of optical power elements is disposed at an end of a respective one of each of the plurality of optical ports, the plurality of optical power elements comprising:
        a first sub-plurality of optical power elements including a plurality of first-optical power element optical axes displaced relative to the plurality of first port optical axes by a first displacement; and
        a second sub-plurality of optical power elements including a plurality of second optical power element optical axes displaced relative to the plurality of second port optical axes by a second displacement.

2. The input section of claim 1, wherein the plurality of optical power elements is a microlens array having a lens pitch.

3. The input section of claim 2 wherein the first sub-plurality of optical ports has a port pitch, that corresponds to the lens pitch of the microlens array.

4. The input section of claim 3 wherein the second sub-plurality of optical ports has a port pitch, that corresponds to the lens pitch of the microlens array.

5. The input section of claim 1, wherein the first displacement is a downward displacement relative to the plurality of the first port optical axes in a direction perpendicular to the plurality of first port optical axes.

6. The input section of claim 5, wherein the second displacement is an upward displacement relative to the plurality of second port optical axes in a direction perpendicular to the plurality of second port optical axes.

7. The input section of claim 5, wherein the second displacement of the plurality of second port optical axes is a displacement that is different from the first displacement of the plurality of first port optical axes.

8. The input section of claim 1, wherein the plurality of optical ports comprise a plurality of optical fibers.

9. A wavelength selective switch (WSS) array for switching a first optical wavelength division multiplexed (WDM) signal and a second WDM signal, the WSS array comprising:
   an input section comprising:
      a plurality of optical ports comprising:
         a first input port that inputs the first WDM signal, wherein the first input port includes a first input port optical axis; and
         a second input port that inputs the second WDM signal, wherein the second input port includes a second input port optical axis; and
      a plurality of optical power elements, wherein each one of the plurality of optical power elements is disposed at an end of a respective one of each of the plurality of optical ports, the plurality of optical power elements comprising:
         a first optical power element including a first optical power element optical axis displaced a first displacement relative to the plurality of first port optical axis; and
         a second optical power element including a second optical power element optical axis displaced a second displacement relative to the second port optical axis;
      wherein the first displacement results in a first displacement angle of the first WDM signal after exiting the first input port; and
      wherein the second displacement results in a second displacement angle of the second WDM signal after exiting the second input port;
   a beam deflection element that deflects one or more wavelength channels of the first and second WDM signals; and
   an optical system interposed between the input section and the beam deflection element, the optical system that:
      receives the first and second WDM signals output at the first and second angles, respectively,
      spectrally disperses the received first and second WDM signals into a first and a second set of wavelength channels, respectively, and
      projects the first set of wavelength channels on a first portion of the beam deflection element and the second set of wavelength channels on a second portion of the beam deflection element.

10. The wavelength selective switch (WSS) of claim 9, wherein the plurality of optical power elements is a microlens array having a lens pitch.

11. The wavelength selective switch (WSS) of claim 10, wherein a first sub-plurality of optical ports of the input section has a port pitch that corresponds to the lens pitch of the microlens array.

12. The wavelength selective switch (WSS) of claim 11, wherein a second sub-plurality of optical ports of the input section has a port pitch that corresponds to the lens pitch of the microlens array.

13. The wavelength selective switch (WSS) of claim 9, wherein the first displacement is a downward displacement in the direction perpendicular to the plurality of first port optical axes.

14. The wavelength selective switch (WSS) of claim 13, wherein the second displacement is an upward displacement in the direction perpendicular to the plurality of second port optical axes.

15. The wavelength selective switch (WSS) of claim 9, wherein the first displacement is different from the second displacement.

16. The wavelength selective switch (WSS) of claim 9, wherein the plurality of optical ports comprise a plurality of optical fibers.

17. The wavelength selective switch (WSS) of claim 9, wherein the beam deflection element is a liquid crystal spatial light modulator.

18. The wavelength selective switch (WSS) of claim 9, wherein the beam deflection element is a liquid crystal on silicon spatial light modulator.

19. A method for routing one or more wavelength channels of a plurality of wavelength division multiplexed (WDM) signals using a wavelength selective switch (WSS) array, the method comprising:
   receiving a first WDM signal from a first input port of a first WSS of the WSS array;
   receiving a second WDM signal from a second input port of a second WSS of the WSS array;
   passing the first WDM signal through a first optical power element having an optical axis that is displaced from an optical axis of the first input port to direct the first WDM signal along a first angle;
   passing the second WDM signal through a second optical power element having an optical axis that is displaced from an optical axis of the second input port to direct the second WDM signal along a second angle;
   passing the first and the second redirected WDM signals through a lens that converts the first and second angles to first and second displacements on a surface of a beam deflection element, wherein the beam deflection element is located at the focal plane of the lens;
   passing the first and second redirected WDM signals through a dispersive element to angularly disperse at least a first and a second wavelength channel from the first and second redirected WDM signals, respectively;
   focusing the first and the second wavelength channels onto a first and a second spatial portion, respectively, of the beam deflection element;
   deflecting along a third angle, by the beam deflection element, the at least one wavelength channel of the first WDM signal;

deflecting along a fourth angle, by the beam deflection element, the at least one wavelength channel of the second WDM signal;

passing the at least one deflected wavelength channel of the first and second WDM signals back through the dispersive element and the lens to convert the third and fourth angles to the first and second angles, respectively;

routing the at least one deflected wavelength channel of the first and second WDM signals respectively out of a first and a second output port of the first and second WSS, respectively.

20. The method of claim 19, wherein the deflecting is accomplished using a liquid crystal spatial light modulator.

21. The method of claim 19, wherein the first and second optical power elements are microlenses from a microlens array.

* * * * *